(12) United States Patent
Lim

(10) Patent No.: US 8,475,950 B2
(45) Date of Patent: Jul. 2, 2013

(54) SECONDARY BATTERY

(75) Inventor: Byung-Ho Lim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 377 days.

(21) Appl. No.: 12/835,470

(22) Filed: Jul. 13, 2010

(65) Prior Publication Data

US 2011/0076528 A1 Mar. 31, 2011

(30) Foreign Application Priority Data

Sep. 28, 2009 (KR) .................. 10-2009-0091800

(51) Int. Cl.
*H01M 2/12* (2006.01)
*H01M 2/00* (2006.01)
*H01M 2/08* (2006.01)

(52) U.S. Cl.
USPC .............................. 429/56; 429/175; 429/163

(58) Field of Classification Search
USPC .............. 429/163–187, 53–56; 221/282
See application file for complete search history.

(56) References Cited

U.S. PATENT DOCUMENTS

| | | | |
|---|---|---|---|
| 2006/0093907 A1* | 5/2006 | Jeon et al. | 429/180 |
| 2006/0115726 A1* | 6/2006 | Jung et al. | 429/181 |
| 2006/0216592 A1* | 9/2006 | Chun | 429/175 |
| 2007/0154796 A1 | 7/2007 | Uh | |
| 2007/0154802 A1* | 7/2007 | Uh | 429/180 |

FOREIGN PATENT DOCUMENTS

| | | |
|---|---|---|
| JP | 2008-192497 | 8/2008 |
| JP | 2008-218390 | 9/2008 |
| JP | 2008-270090 | 11/2008 |
| KR | 10 2006 0047689 | 5/2006 |
| KR | 10-2007-0071233 | 7/2007 |

OTHER PUBLICATIONS

Office Action dated Sep. 19, 2011 for corresponding KR Application No. 10-2009-0091800.

* cited by examiner

*Primary Examiner* — Patrick Ryan
*Assistant Examiner* — Kiran Quraishi
(74) *Attorney, Agent, or Firm* — Knobbe, Martens, Olson & Bear, LLP

(57) ABSTRACT

There is provided a secondary battery enabling an electrode terminal to be deformed in an internal direction of a can by preventing the upper plate of the can from being deformed in an internal direction of the can when a compression is applied in a direction perpendicular to the longitudinal axis. In one embodiment, a secondary battery includes a can having one opened portion to accommodate an electrode assembly. An upper plate is positioned at the opened portion of the can and has a pair of short side portions and a pair of long side portions connected both sides of the short side portions. In the secondary battery, a short circuit preventing portion formed thinner than other regions while crossing between the long side portions is further formed at a central portion of the bottom surface of the upper plate. Accordingly, the stability of the secondary battery can be improved.

13 Claims, 5 Drawing Sheets

SECONDARY BATTERY

RELATED APPLICATIONS

This application claims priority to and the benefit of Korean Patent Application No. 10-2009-0091800, filed on Sep. 28, 2009, in the Korean Intellectual Property Office, the entire content of which is incorporated herein by reference.

BACKGROUND

1. Field

An aspect of the present invention relates to a secondary battery, and more particularly, to a secondary battery capable of preventing a short circuit between an electrode terminal and an electrode assembly when a longitudinal compression is applied to the secondary battery.

2. Description of the Related Art

As the miniaturization and lightweight of portable electronic devices make rapid progress, many studies have recently been conducted to develop secondary batteries used as driving power sources of the portable electronic devices. Such secondary batteries are divided into, for example, a nickel-cadmium battery, a nickel-hydrogen battery, a nickel-zinc battery, a lithium secondary battery and the like.

Among them, the lithium secondary battery is rechargeable, compact and large in capacity, and thus is widely applied to high-tech electronic devices because of its high operating voltage and high energy density per unit weight. Such a lithium secondary battery is formed by inserting an electrode assembly together with an electrolyte into a can and then sealing the top of the can with a cap assembly. Here, the electrode assembly includes a positive electrode plate, a negative electrode plate and a separator interposed between the positive and negative electrode plates.

In this case, the electrode assembly is formed by winding the positive electrode plate, the negative electrode plate and the separator. A positive electrode tab is connected to the positive electrode plate to protrude upward from a top portion of the electrode assembly. A negative electrode tab is connected to the negative electrode plate to protrude upward from a top portion of the electrode assembly. In the electrode assembly, the positive and negative electrode tabs are spaced apart from each other at a predetermined interval so as to be electrically isolated from each other.

The cap assembly includes a cap plate, an insulation plate, a terminal plate and an electrode terminal. The cap assembly is coupled to a separate insulation case and seals the can while being coupled to the top opening of the can. Holes for positive and negative electrode tabs are formed at the insulation case. The positive and negative electrode tabs are respectively inserted into the holes so as to prevent a short circuit between an upper portion of the electrode assembly inserted into the can and a lower portion of the cap assembly. The insulation case functions to inhibit a short circuit that may be caused by the contact of the bent negative and positive electrode tabs with an inner wall of the can.

In the lithium secondary battery configured as described above, as its energy density becomes higher, its thickness becomes thinner. Hence, the lithium secondary battery is less resistant to impact and compression. When impact or compression is applied to the lithium battery, ignition and explosion of the lithium secondary battery may occur as a result of deformation of the electrode assembly accommodated in the can, a short circuit between the electrode plates due to the deformation of the electrode assembly, and the like.

This is a problem when the lithium secondary battery is deformed by a longitudinal compression force (in a direction perpendicular to the longitudinal axis), such as in a longitudinal compression test. This test is one of items for stability of the lithium secondary battery. Often, a local pressure is applied to an upper portion of the electrode assembly in the can while the top surface of the can is bent inside the can, thereby resulting in deformation of the electrode assembly in the can and a short circuit between the electrode plates due to the deformation of the electrode assembly.

SUMMARY

Accordingly, there is provided a secondary battery which includes a short circuit preventing portion formed so as to be thinner than other regions at a central portion of the bottom surface of an upper plate. The portion crosses between long side portions of the plate, so that an electrode terminal can be deformed in an internal direction of a can by preventing the upper plate of the can from being deformed in an internal direction of the can when a compression is applied to the secondary battery in a direction perpendicular to the longitudinal axis.

According to an aspect of the present invention, there is provided a secondary battery including a can having one opened portion to accommodate an electrode assembly; and an upper plate positioned at the opened portion of the can, the upper plate having a pair of short side portions and a pair of long side portions connected both sides of the short side portions, where a short circuit preventing portion formed thinner than other regions while crossing between the long side portions is further formed at a central portion of the bottom surface of the upper plate.

The upper plate may be an insulation case.

The upper plate may be a cap plate.

The short circuit preventing portion may be a groove of which the vertical section is formed in a polygonal shape.

The short circuit preventing portion may be a groove of which the vertical section is formed in a semicircular shape.

The vertical section of the short circuit preventing portion may be formed so that the thickness of the upper plate is gradually decreased from positions respectively spaced apart from both ends of the long side portion at a predetermined distance to the central portion of the long side portion.

The horizontal section of the short circuit preventing portion may be formed in a straight line shape.

The depth of the short circuit preventing portion may be about 30 to 50% of the thickness of the upper plate.

In another embodiment a secondary battery is provided. In this embodiment, the secondary battery includes a can that receives an electrode assembly wherein the can defines a longitudinal axis. The battery further includes a cap assembly that is positioned on the can so as to extend in the direction of the longitudinal axis of the can. In this embodiment the cap assembly includes at least one plate that has a deformation that extends in a first direction perpendicular to the longitudinal axis. In this embodiment, the deformation is formed so that forces exerted against the can in a second direction perpendicular to the longitudinal axis of the can results in the at least one plate deforming outward in a direction parallel to the longitudinal axis to inhibit short circuit in the electrode assembly.

As described above, according to the present invention, a short circuit preventing portion formed thinner than other regions while crossing between long side portions opposite to each other are formed at the central portion of the bottom surface of a cap plate of a secondary battery, so that it is possible to prevent the cap plate from being deformed in an internal direction of a can when a compression is applied to the secondary battery in a direction perpendicular to the longitudinal axis. Thus, an electrode terminal is deformed toward the exterior of the can, so that it is possible to prevent deformation of an electrode assembly and ignition or explosion caused by a short circuit between electrode plates due to the deformation of the electrode assembly. Accordingly, the stability of the secondary battery can be improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
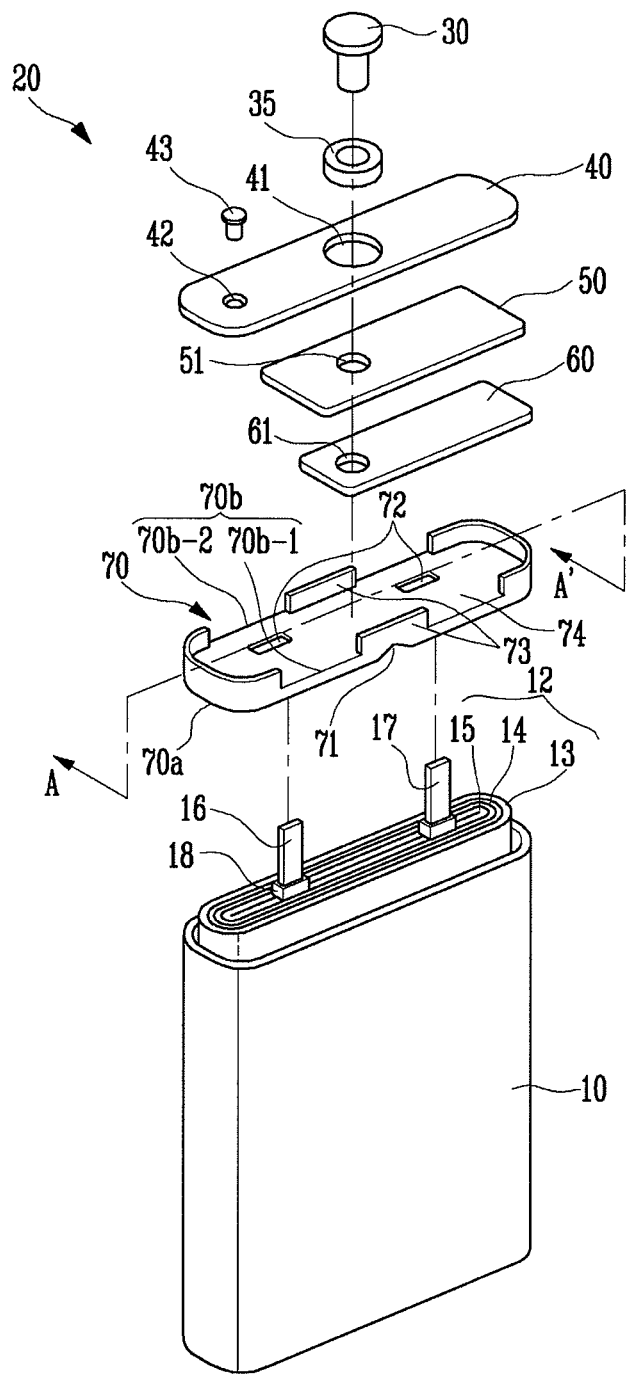
FIG. 1 is an exploded perspective view of a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is an exploded perspective view of a secondary battery according to an embodiment of the present invention.

Referring to FIG. 1, the secondary battery according to the embodiment of the present invention includes an electrode assembly 12, a can 10 and an upper plate. Here, the upper plate includes a cap assembly 20 and an insulation case 70 positioned between the electrode assembly 12 and the cap assembly 20.

The insulation case 70 is positioned between the electrode assembly 12 and the cap assembly 20 so that they are electrically isolated from each other. More specifically, the insulation case 70 is positioned in the state of being inserted into the top portion of the can 10. Corners of the insulation case 70 are formed in a rounded rectangular shape identical to the horizontal sectional shape of the can 10 so that the insulation case 70 can be forcibly fitted into the can 10.

The insulation case 70 includes a pair of short side portions 70a and a pair of long side portions 70b. A short circuit preventing portion 71 formed thinner than other regions is formed at a central portion of the bottom surface of the insulation case 70. Preferably, the short circuit preventing portion 71 is formed to cross between the long side portions 70b opposite to each other. Here, the vertical section of the short circuit preventing portion 71 is formed in a notch shape, i.e., a V shape, and the horizontal section of the short circuit preventing portion 71 is formed in a straight line shape.

As described above, since the insulation case 70 according to the embodiment of the present invention has the short circuit preventing portion 71 formed at the central portion of the bottom surface thereof, the short circuit preventing portion 71 can be deformed in an external direction of the can 10 when a longitudinal compression is applied to the secondary battery.

Further, as the short circuit preventing portion 71 is deformed in the external direction of the can 10, a cap plate 40 positioned above the insulation case 70 is deformed in the external direction of the can 10, so that an electrode terminal 30 inserted into the cap plate 40 can also be deformed in the external direction of the can 10. Accordingly, when a longitudinal compression is applied to the secondary battery, the upper plates 40 and 70 positioned above the can 10 do not apply pressure to the electrode assembly 12, thereby reducing the risk of a short circuit between the electrode plates.

Here, the longitudinal compression refers to a phenomenon in which the secondary battery using the can 10 is compressed so that the two short side portions 70a formed in a height direction of the can 10 are pushed toward each other by an external force. At this time, long side portions 10b (see FIG. 5) of the can 10 are usually separated or pulled apart from each other.

The insulation case 70 is generally manufactured by using a light plastic resin with excellent electric insulation. Therefore, when the insulation case 70 is inserted into the can 10, the deformation of the insulation case 70 is hardly caused by the electrolyte, and it is easy to secure insulation between the electrode assembly 12 and the cap assembly 20. However, when a light plastic resin is used as the insulation case 70, it is difficult to couple the insulation case 70 to the can 10 due to its weak elasticity. Therefore, to solve such a problem, the insulation case 70 includes a base portion 74 and a support portion 73. Accordingly, the insulation case 70 can be stably coupled to the can 10.

The electrode assembly 12 is formed by winding a positive electrode plate 15, a negative electrode plate 13 and a separator 14 interposed between the positive and negative electrode plates 15 and 13. A positive electrode tab 16 is connected to the positive electrode plate 15 to protrude upward from a top portion of the electrode assembly 12, and a negative electrode tab 17 is connected to the negative electrode plate 13 to protrude upward from a top portion of the electrode assembly 12. In the electrode assembly 12, the positive and negative electrode tabs 16 and 17 are spaced apart from each other at a predetermined interval so as to be electrically isolated from each other. An insulation tape 18 for preventing a short circuit between electrodes is wound at portions of the positive and negative electrode tabs 16 and 17, drawn out from the electrode assembly 12.

That is, the positive and negative electrode taps 16 and 17 are electrically connected to the can 10 or a terminal plate 60 by respectively passing through lid through-holes 72 of the insulation case 70 fixed to the top of the electrode assembly 12 in the can 10.

The can 10 accommodates the electrode assembly 12 through an opened side thereof. The horizontal section of the can 10 is formed in a rectangular shape with rounded corners. However, the horizontal sectional shape of the can 10 is not limited thereto. Although not shown in this figure, it will be apparent that the horizontal sectional of the can 10 may be formed in a rectangular or elliptical shape.

The cap assembly 20 includes a cap plate 40, an electrode terminal 30, an insulation plate 50, a terminal plate 60 and a gasket 35. When the cap assembly 20 is coupled to the can 10, the cap plate 40 allows the opened surface of the can 10 to be sealed tightly, thereby forming one surface of the can 10. In addition, the cap plate 40 is electrically connected to any one of the positive and negative electrode tabs 16 and 17 drawn out by respectively passing through the lid through-holes 72 of the insulation case 70. A first terminal hole 41 for coupling the gasket 35 to the cap plate 40 therethrough and an electrolyte injection hole 42 for injecting an electrolyte are formed at the cap plate 40. The electrolyte injection hole 42 is formed at the cap plate 40 and used as a passage through the electrolyte is injected into the can 10. After the electrolyte is injected into the can 10, the electrolyte injection hole 42 is tightly sealed with a stopper 43.

The gasket 35 is used to secure insulation between the electrode terminal 30 and the cap plate 40. A terminal hole for coupling the electrode terminal 30 to the gasket 35 therethrough is formed at the gasket 35, and the electrode terminal 30 is coupled to the gasket 35 by passing through the terminal hole. The insulation plate 50 is interposed between the cap plate 40 and the terminal plate 60 so that they are isolated from each other. A second terminal hole 51 is formed at the insulation plate 50 so that the electrode terminal 30 can pass through the insulation plate 50.

The terminal plate 60 is electrically connected to the electrode terminal 30 through a third terminal hole 61. The terminal plate 60 is electrically connected to any one of the positive and negative electrode tabs 16 and 17, which is not connected to the cap plate 40. That is, when the cap plate 40 is electrically connected to the positive electrode tab 16, the terminal plate 60 is connected to the negative electrode tab 17. Accordingly, the terminal plate 60 can relay electrical connection of the electrode terminal 30 and the negative electrode tab 17.

Figure 2A:
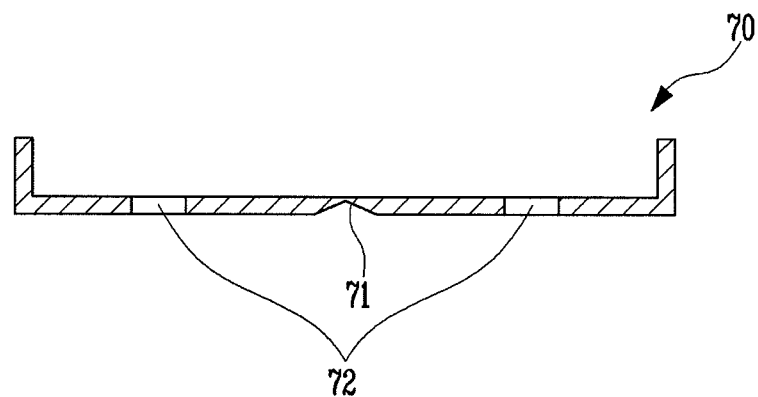
FIG. 2A is a sectional view taken along line A-A' of FIG. 1.
Figure 2B:
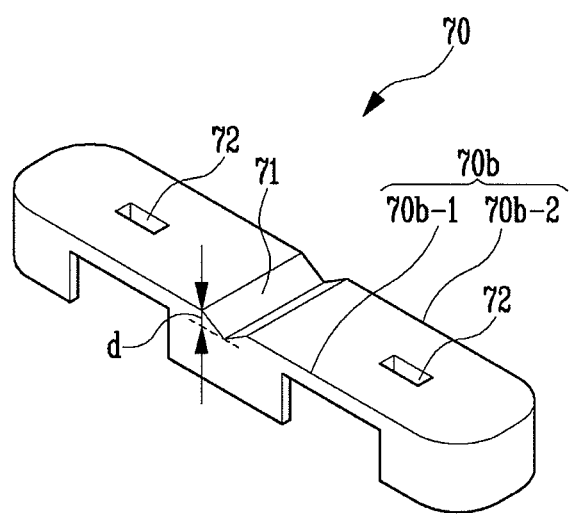
FIG. 2B is a bottom perspective view of an insulation case according to the embodiment of the present invention.

FIG. 2A is a sectional view taken along line A-A' of FIG. 1. FIG. 2B is a bottom perspective view of the insulation case according to the embodiment of the present invention.

Referring to FIGS. 2A and 2B, the short circuit preventing portion 71 is formed at the central portion of the bottom surface of the insulation case 70. The short circuit preventing portion 70 is a region formed thinner than other regions of the bottom surface of the insulation case 70 while crossing the long side portions 70b opposite to each other. In this embodiment, the vertical section of the short circuit preventing portion 71 is formed in a notch shape, i.e., a V shape.

At this time, the short circuit preventing portion 71 is roughly formed in a straight line shape from the center of one long side portion 70b-1 to the center of the other long side portion 70b-2. However, the present invention is not limited thereto. That is, the short circuit preventing portion 71 may be formed in various shapes crossing from a central portion of the one long side portion 70b-1 to a central portion of the other long side portion 70b-2 so that the insulation case 70 can be deformed in the external direction of the can 10 (see FIG. 1) when a longitudinal compression is applied to the secondary battery.

Here, the depth d of the short circuit preventing portion 71 may be about 30 to 50% of the thickness of the insulation case 70. If the depth d of the short circuit preventing portion 71 is too deep, the durability of the insulation case 70 may be damaged. If the depth d of the short circuit preventing portion 71 is too shallow, the insulation case 70 may not be easily opened toward the exterior of the can 10 under a desired pressure.

Figure 3:
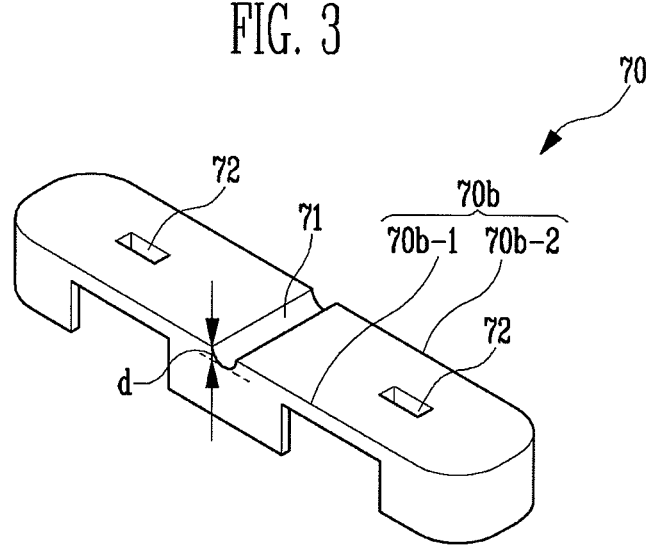
FIG. 3 is a bottom perspective view of an insulation case according to another embodiment of the present invention.

FIG. 3 is a bottom perspective view of an insulation case according to another embodiment of the present invention.

Referring to FIG. 3, a short circuit preventing portion 71 formed thinner than other regions of the bottom surface of the insulation case 70 is formed at the bottom surface of the insulation case 70. Here, the short circuit preventing portion 71 is formed in a shape crossing from a central portion of one long side portion 70b-1 to a central portion of the other long side portion 70b-2. In this embodiment, the vertical section of the short circuit preventing portion 71 is formed in a semicircular shape. Like the short circuit preventing portion 71 of FIG. 2, the depth d of the short circuit preventing portion 71 may be about 30 to 50% of the thickness of the insulation case 70.

Figure 4:
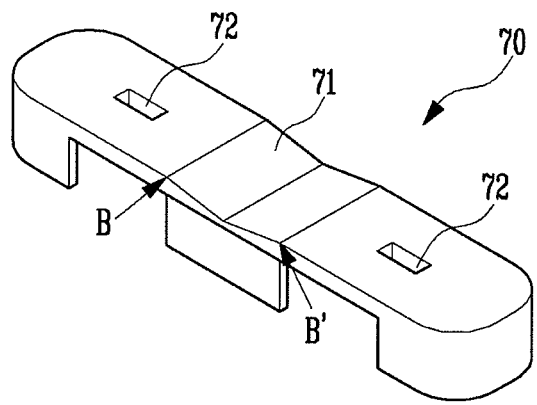
FIG. 4 is a bottom perspective view of an insulation case according to still another embodiment of the present invention.

FIG. 4 is a bottom perspective view of an insulation case according to still another embodiment of the present invention.

Referring to FIG. 4, a short circuit preventing portion 71 is formed at the bottom surface of the insulation case, like the short circuit preventing portions 71 of FIGS. 2 and 3. At this time, the vertical section of the short circuit preventing portion 71 is formed in an inclined shape so that the thickness of the insulation case 70 is gradually decreased from a positions B and B' to the central portion of the long side portion. Here, the positions B and B' are spaced apart at a predetermined distance from both ends of the long side portion, respectively. Accordingly, when a longitudinal compression is applied to a secondary battery, the central portion of the insulation case 70 can be bent upward.

Figure 5A:
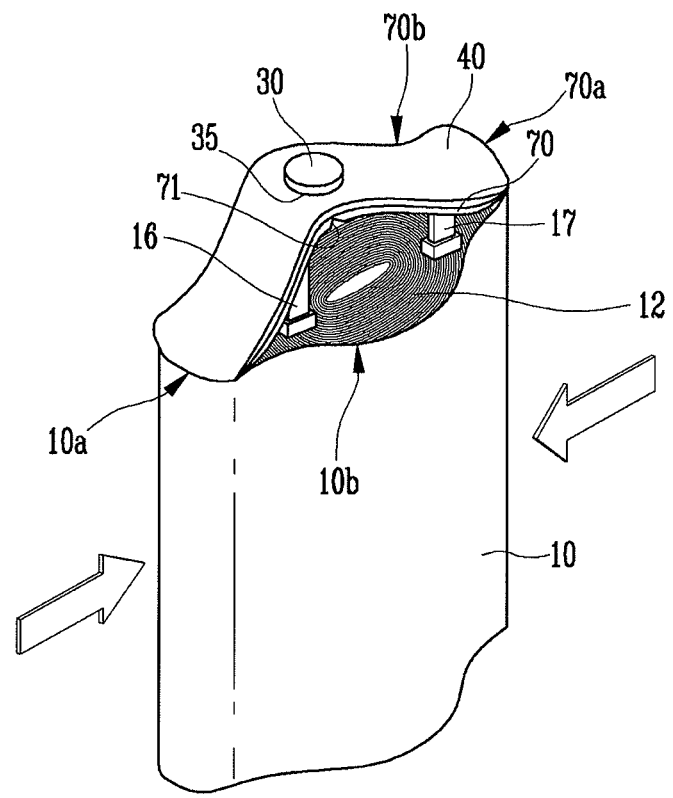
FIG. 5A is a perspective view illustrating a deformed state of a secondary battery when a longitudinal compression is applied to the secondary battery according to the present invention.
Figure 5B:
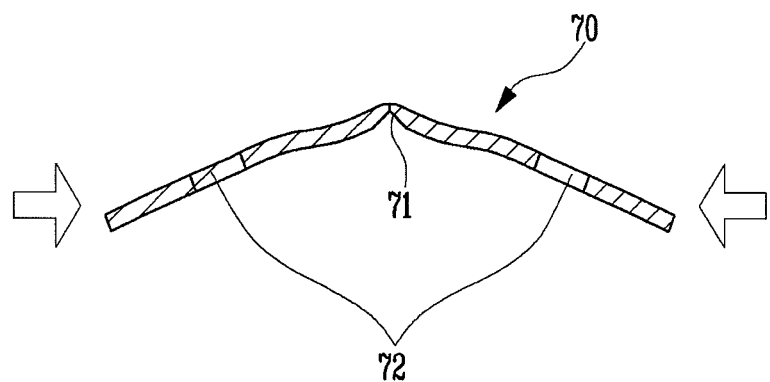
FIG. 5B is a sectional view of the insulation case deformed after the longitudinal compression is applied to the secondary battery.

FIG. 5A is a perspective view illustrating a deformed state of a secondary battery when a longitudinal compression is applied to the secondary battery according to the present invention. FIG. 5B is a sectional view of the insulation case deformed after the longitudinal compression is applied to the secondary battery.

Referring to FIGS. 5A and 5B, the secondary battery according to the present invention is deformed by applying a longitudinal compression thereto so that two short side portions 70a formed in a height direction of a can 10 of the secondary battery are pushed toward each other by an external force. Since an insulation case 70 and a cap plate 40 are joined together with the can 10, their joined state is broken if a strong pressure is applied to the secondary battery from both sides of the short side portions 70a. At this time, the insulation case 70 and the cap plate 40 can be deformed while being bent in an external direction of the can 10 by a short circuit preventing portion 71 formed in the center of the bottom surface of the insulation case 70.

Accordingly, a gasket 35 and an electrode terminal 30, formed at the center of the cap plate 40, are positioned at the uppermost portion, and both side portions of the insulation case 70 and the cap plate 40 remain in the state of being joined together with short side portions 10a of the can 10, respectively. Here, long side portions 10b of the can 10 are deformed so that their central portions are protruded in the outermost direction by the longitudinal compression. That is, the long side portions 10b of the can 10 are usually separated or pulled apart from each other. The electrode assembly 12 positioned inside the can 10 can also be deformed as the long side portions 10a of the can 10 are deformed.

Figure 6:
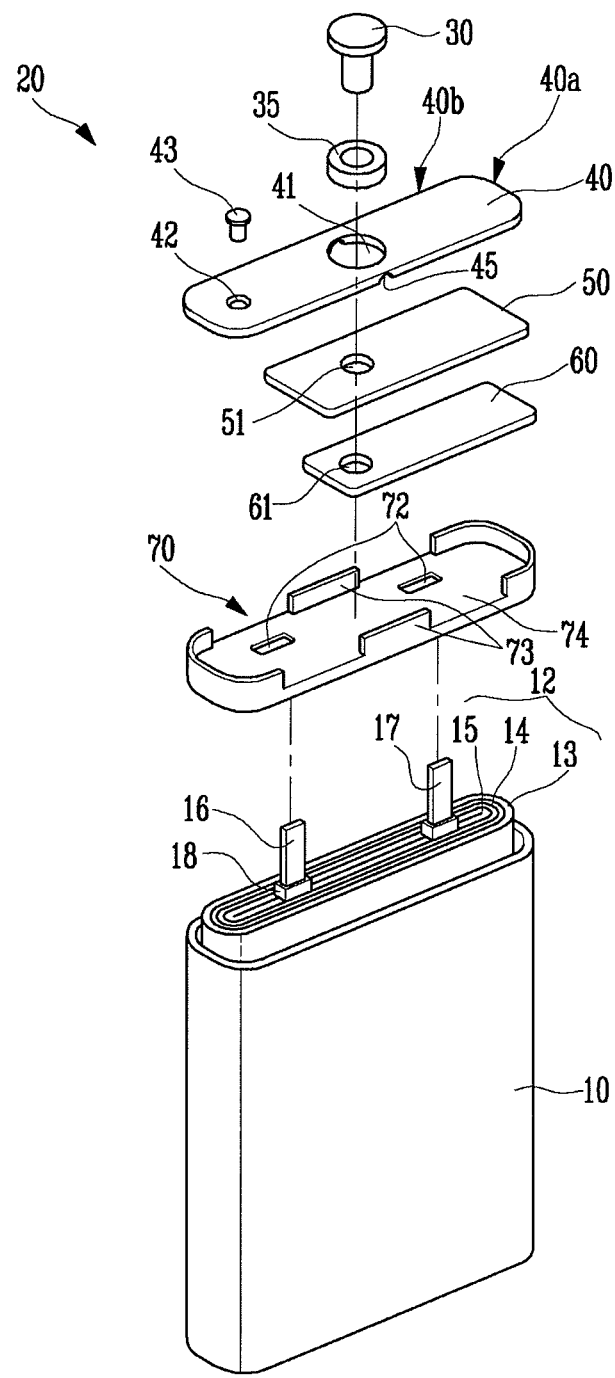
FIG. 6 is an exploded perspective view of a secondary battery according to still another embodiment of the present invention.

FIG. 6 is an exploded perspective view of a secondary battery according to still another embodiment of the present invention.

Hereinafter, descriptions of components of FIG. 6 identical to those of FIG. 1 will be omitted. Referring to FIG. 6, the secondary battery according to the embodiment of the present invention includes a can 10 having one opened side to accommodate an electrode assembly 12, a cap assembly 20 for sealing the opened portion of the can 10 therewith, and an insulation case 70 positioned between the can 10 and the cap assembly 40.

Here, the horizontal section of the can 10 is formed in a rectangular shape with rounded corners, and a cap plate 40 in the cap assembly 20 is also formed in a rectangular shape with rounded corners. The cap plate 40 includes a pair of short side portions 40a and a pair of long side portions 40b connected to both sides of the short side portions 40a.

A short circuit preventing portion 45 formed thinner than other regions while crossing between the long side portions 40b opposite to each other may be further formed at a central portion of the bottom surface of the cap plate 40. At this time, the vertical section of the short circuit preventing portion 45 may be formed in various polygonal shapes. Preferably, the horizontal section of the short circuit preventing portion 45 is formed in a straight line shape. Like when the short circuit preventing portion 71 of FIG. 2 is formed at the insulation case 70, the depth of the short circuit preventing portion 45 may be about 30 to 50% of the thickness of the cap plate 40.

As described above, in the secondary battery according to the embodiment of the present invention, the short circuit preventing portion 45 formed thinner than other regions while crossing between the long side portions 40b opposite to each other are formed at the central portion of the bottom surface of the cap plate 40, so that it is possible to prevent the cap plate 40 from being deformed in an internal direction of the can 10 when a compression is applied to the secondary battery in a direction perpendicular to the longitudinal axis. Thus, an electrode terminal 30 is deformed toward the exterior of the can 10, so that it is possible to inhibit deformation of the electrode assembly 12 and ignition or explosion caused by a short circuit between electrode plates due to the deformation of the electrode assembly 12. Accordingly, the stability of the secondary battery can be improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
a can having one opened portion to accommodate an electrode assembly;
a cap plate; and
an upper plate comprising an insulation case positioned at the opened portion of the can, the upper plate having a pair of short side portions and a pair of long side portions connected both sides of the short side portions,
wherein a short circuit preventing portion formed thinner than other regions while crossing between the long side portions is further formed at a central portion of the bottom surface of the upper plate and wherein the short circuit preventing portion is formed so as to partially extend through the thickness of the upper plate.

2. The secondary battery according to claim 1, wherein the short circuit preventing portion is a groove of which the vertical section is formed in a polygonal shape.

3. The secondary battery according to claim 1, wherein the short circuit preventing portion is a groove of which the vertical section is formed in a semicircular shape.

4. The secondary battery according to claim 1, wherein the vertical section of the short circuit preventing portion is formed so that the thickness of the upper plate is gradually decreased from positions respectively spaced apart from both ends of the long side portion at a predetermined distance to the central portion of the long side portion.

5. The secondary battery according to claim 1, wherein the horizontal section of the short circuit preventing portion is formed in a straight line shape.

6. The secondary battery according to claim 1, wherein the depth of the short circuit preventing portion is about 30 to 50% of the thickness of the upper plate.

7. A secondary battery comprising:
a can having an opening that receives an electrode assembly wherein the can defines a longitudinal axis;
a cap assembly that is positioned on the can so as to extend in the direction of the longitudinal axis of the can, wherein the cap assembly includes a cap plate and at least one plate that comprises an insulation case positioned within opening of the can to seal the can that has a deformation that extends in a first direction perpendicular to the longitudinal axis wherein the deformation is formed so as to only partially extend through the thickness of the at least one plate so that forces exerted against the can in a second direction perpendicular to the longitudinal axis of the can result in the at least one plate deforming outward in a direction parallel to the longitudinal axis to inhibit short circuits in the electrode assembly.

8. The battery of claim 7, wherein the second direction is perpendicular to first direction.

9. The battery of claim 7, wherein the at least one plate has two long sides and two short sides and wherein the deformation comprises a groove that extends between the two long sides.

10. The battery of claim 9, wherein the groove has a polygonal shape.

11. The battery of claim 9, wherein the groove has a semicircular shape.

12. The battery of claim 9, wherein a vertical section of the groove is formed so that the thickness of the at least one plate is gradually decreased from positioned respectively spaced apart from both ends of the long sides at a predetermined distance to the central portion of the long sides.

13. The battery of claim 9, wherein the depth of the groove is about 30 to 50 percent of the thickness of the plate.

* * * * *